Patented Mar. 21, 1933

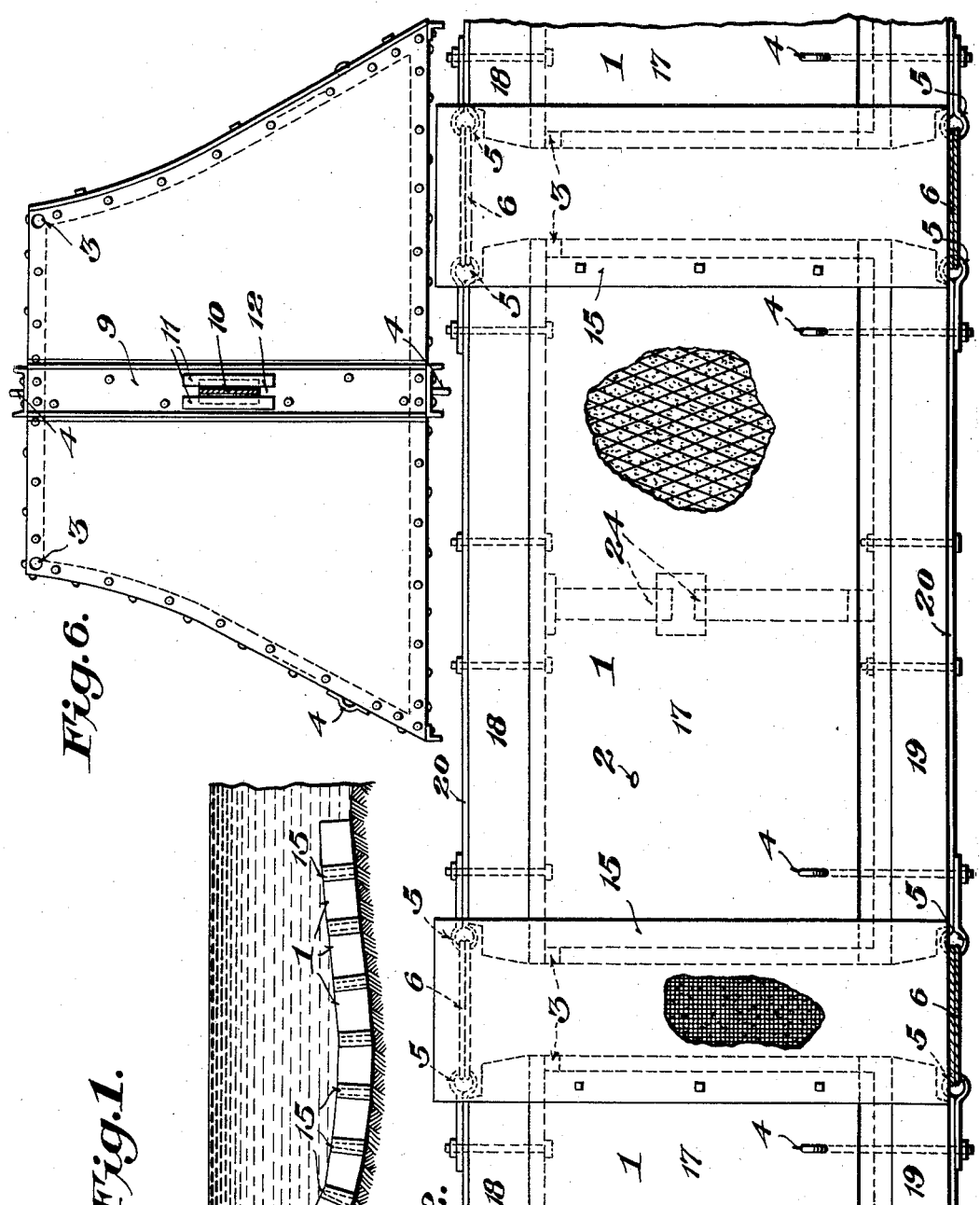

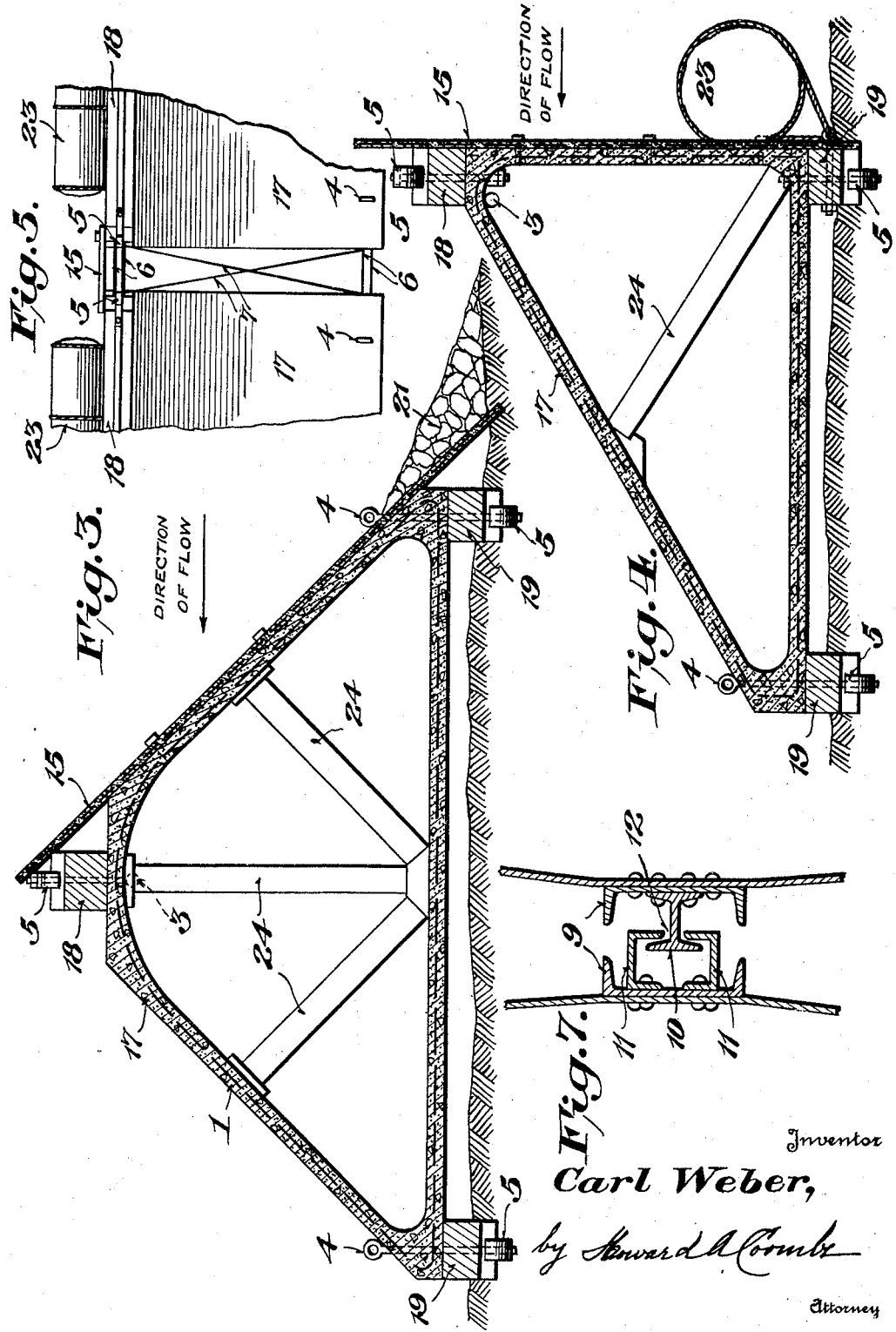

1,902,741

UNITED STATES PATENT OFFICE

CARL WEBER, OF JACKSONVILLE, FLORIDA

DIVERSION DAM

Application filed December 1, 1930. Serial No. 499,355.

This invention relates to subaqueous diversion dams, sometimes called ground weirs, groynes, dikes or sills, which are laid on the beds of streams or rivers to divert the flow of the water. Such diversions of flow are required for various purposes, such as, the prevention of shore erosion, the removal or prevention of sand or mud banks, the control of navigable channels, the straightening of the river bed, or the building up of low lands by accretion, for example.

The use of these dams has, however, heretofore been a very restricted one, on account of their cost, especially in deep water. They have been built of such materials as fascines, broken stone, ballasted wood cribbing, etc., but have not proved satisfactory on account of their insufficient density and lack of a sufficiently even and smooth upstream face.

The use of coffer dams and caissons is adapted for very short dams only, close to shore and in quiet and shallow water, and such dams are very costly.

The object of my invention is to provide a mode of construction of diversion dams, which is economical and efficient, by which such dams can be built on shore in sections, floated to place and sunk in any depth of water, without the need of any auxiliary or temporary structures, such as coffer dams, for example.

The new dam is composed of a plurality of separate, hollow, watertight sections, made of wood, steel or concrete, or a combination of such materials. These sections are flexibly connected together, so that the resulting dam may be able to conform itself to uneven surfaces on the river bed. The spaces between the adjoining sections are covered or bridged over by mats of sufficient flexibility to adapt themselves to the sections, even when the alinement of the same is imperfect due to uneven ground or other cause.

The construction of a typical subaqueous diversion dam, in accordance with my invention, will now be described in detail with reference to the accompanying drawings, in which, Fig. 1 illustrates the dam in place on a river bed;

Fig. 2 is a front elevation of several sections of the dam connected together;

Fig. 3 is a cross section of one of the sectional units of the dam of Figs. 1 and 2, Fig. 4 is a cross section of a unit of a different shape;

Fig. 5 is a plan view, on a small scale, of the unit of Fig. 4 and of the end of an adjacent unit connected thereto;

Fig. 6 is an end view of a unit of somewhat different construction; and

Fig. 7 is a detail section of the connecting means of a pair of the units of Fig. 6.

These views are intended to show how the principle of the invention may be embodied, but many variations of the structures shown can be made without departing from the principle.

As stated above, the dam is made up of any desired number of individual units or sections 1, which are hollow, water-tight casings of such dimensions and weight that they will float and which are provided with openings 2, see Fig. 2, to admit water when they are to be sunk, or with openings of greater size if they are to be loaded with sand or stone. The openings are closed, of course, when the sections are floated. Air vents 3 are provided in the upper part of each unit to allow the air to escape when the ballast is admitted. Eyebolts or hooks 4 are provided for the attachment of control cables, which are removed after the dam has been sunk. The flexible means for connecting the units together consists in Figs. 2–5, of cables 6, made fast to eyebolts 5, secured at the top and bottom of each unit. The length of these cable couplings determines the degree of flexibility of the dam. Greater spacing of the units is required for dams which are to be placed on a very irregular river bed than for those which are to be laid on flat bottoms. In the latter case, longer units, closely coupled, are advantageously used. Whenever long couplings make it necessary cross lashings 7, consisting of steel rods or cables and also secured to said eyebolts 5, are used to give additional lateral stability and improved longitudinal alinement.

The unit, shown in Fig. 6, is built of steel plates, reinforced by angle irons at the edges and having channel-irons 9, riveted to the center of the ends, top and bottom. This unit is more nearly rectangular than those of Figs. 1 and 2 and has its up and downstream sides slightly concave. This is illustrative of the fact that the units may have any desired shape. A different form of connecting means is also here shown. This means consists of an I-beam 10, riveted within the channel iron 9 on one end of the unit, and two small channel-irons 11, riveted within the channel-iron 9 on the other end by means of one of their legs, so as to leave a space 12 between the ends of their other legs, through which space the web 13 of the I-beam 10, on the end of an adjacent unit, extends, thus providing for a limited relative angular movement between the units.

The gaps or spaces between the several units must be closed on the upstream side of the dam, and this is effected by sealing mats 15, having a certain amount of flexibility and secured to one unit along one edge, the other edge of the mat being left free to accommodate itself to the surface of the adjoining unit. These mats may be made of rubber, canvas or thin reinforced concrete plates, the reinforcement, in the latter case, being of wire mesh or the like, capable of flexing slightly. The water pressure, assisted by the weight of the mat, will press the latter against the units to a sufficiently close fit. Any cracks in the mats are of no consequence, since the reinforcement will prevent rupture. The small amount of seepage, that may percolate through such cracks, is negligible, as the cracks are quickly closed by silting and accretion. The mats are put in place before the dam is submerged, so that no diving or other submarine work is necessary.

The triangular units, shown in Figs. 2, 3, and 4 are made of reinforced concrete 17, with a top timber wale 18 and two bottom timber wales 19 secured thereto. These wales serve to equalize and take up the longitudinal stresses, especially during the sinking operation, and to distribute the bending and torsional stresses set up when the dam rests on uneven ground. This permits the use of relatively light reinforced concrete construction. The wales may be reinforced, if necessary, by rods or flat irons 20, see Fig. 2. The bottom wales also serve the purpose of sealing the dam by sinking into the soft ground and thus shutting off the flow of water under the dam. On hard and uneven river beds, or where additional security against underflow is desired, a deposit 21, Fig. 3, of rip-rap stone or gravel can be placed on the upstream side.

Fig. 4 shows a form of unit which is unsymmetrical in shape, that is, heavier on one side than the other, and having a vertical upstream side. To balance these units, I provide temporary rafts, pontoons or air chambers 23, by which the units are floated and sunk in the correct position. They are detached as soon as the dam is submerged. Internal bracing 24 is provided wherever necessary.

The steel reinforcement of a reinforced concrete cell or dam section and of a sealing mat is shown as to consist of expanded metal 16, it is evident that any other type or form of reinforcement may be selected for the intended purpose.

In order to describe more completely the general method of the building of such dams it becomes necessary to select, as the basis of such description, a somewhat definite installation. The details of operation for the forming and placing of subaqueous diversion dams must naturally be adjusted to the various conditions of the shore-line, depth and velocity of current of the water, equipment available and many other contingencies.

Therefore, for present purposes, the following assumptions are made:

1. The dam shall be built under shore and water conditions, as shown in Fig. 1, at right angles to the shore-line.
2. Reinforced concrete construction, as shown in Figs. 2, 3, and 4, has been selected for the dam structure.
3. The dam shall be submerged by water ballast.
4. The river bed consists of alluvial soil deposit and is reasonably free of obstructions such as rocks, tree stumps, old piling, wrecks or the like.
5. There are no shore line obstructions such as landing piers, docks, houses, trees or the like that hinder free access to the work or require special working arrangements.

Based upon these assumptions the construction of the dam proceeds as follows:

After the necessary surveys and soundings have been made the details of designs are worked out. These details show whether or not the dam can be built of sections all of the same height and length or, if in order to obtain an even grade of the top of the dam, certain sections must be built of greater height, to take care of depressions in the river bed. If it is advisable to excavate or fill certain parts of the dam site, this must, of course, be done before the dam is submerged.

The concrete units are then built in accordance with the design requirements and of such different heights and lengths as are specified.

The dam sections are built at any convenient place, wherever water transportation to the dam site is available and where working conditions, material and labor supply and other provisions are most favorable.

The dam-units may be built in a dry-dock, on pontoons or in bark-like floating forms, on marine railways or the like if such conveniences are available.

The cheapest and most efficient way, however, is to fabricate the dam sections on land during a low-flood stage of the river and to utilize the rising water for the floatation of the dam.

If the dam can be built during extreme low water periods, which exposes the river bed for a sufficiently long time, the dam could, of course, be built right in place at the dam site. This condition, however, is only possible in rivers that run practically dry during certain periods of the year or that are controlled by locks or dams. Subaqueous diversion dams, such as are herein specified, are, however, seldom used in such rivers or the like.

The building of the various dam units proceeds in the customary manner, stationary or movable concrete forms are used as desired and the reinforcing steel, concrete wales and attachments are placed in accordance to established construction practice.

Before or immediately after the launching of the dam the units are lined up in proper succession and coupled together as indicated in Figures 1, 2, and 5. The dam is then floated by means of towboats or by the water current to the contemplated site. Very long dams may, of course, be transported in two or more parts, which are then united at the proper place.

Upon arriving at the building site the dam is lined up on the surface of the water, directly above its final resting place, and is held in position by lines attached to the various cells by means of the eyes or hooks, 4, provided for this purpose, until the dam is in the correct sinking position.

The next step is the placing and fastening of the sealing mats. The couplings and all other permanent fittings are checked over again and the vent-holes, 3, provided for the escapement of the entrapped air within the cells, are opened.

The units are then filled with water ballast to the point of floating awash, alignment receives a final check and then more ballast is admitted as required, to sink the entire dam structure under steady control and observation.

The sinking process may, of course, be varied in many ways. It may be preferable to submerge one end or the center of the wall more rapidly than the other sections. This is easily accomplished by a corresponding adjustment of the opening of the seacocks of each unit or by variation in quantity of the initial ballasting material.

In this manner, the dam structure acting like a giant chain, can be placed quickly and accurately in any desired condition, regardless of depth or velocity of the water and without the aid of any temporary cofferdams or other auxiliary structures. Only for the placing of unsymmetric dams balancing parts or pontoons 23, are required but these, like the temporary control cables and anchors, are released after use. They do not form a part of the contemplated structure. They may be used again for the same or any other purpose.

Having thus described my invention, what I claim is:

1. A diversion dam composed of sinkable independent hollow units, flexible couplings uniting said units and a flexible mat secured to each unit to overlap the joint between it and the adjacent unit.

2. A diversion dam composed of independent hollow reinforced concrete units, flexible means connecting said units, and flexible reinforced concrete mats over the spaces between the units on the upstream side.

3. A diversion dam composed of independent hollow units of substantially triangular shape, beams reinforcing said units, openings for admitting ballast for sinking said units, means flexibly connecting said units at their top and bottom, and flexible mats secured by one edge to each unit and overlapping the edge of the adjoining unit.

4. A diversion dam composed of independent hollow steel units, channel irons on the tops, bottoms and ends of each unit, an I-beam secured to the channel iron on one end of each unit, a pair of small channel irons secured by one leg to the channel iron on the other end of each unit, so as to leave a space between the ends of their free legs to receive the web of said I-beam, and flexible mats covering the spaces between the units on the upstream side.

Signed at Jacksonville, in the county of Duval and State of Florida this 29th day of November A. D. 1930.

CARL WEBER.